Aug. 17, 1937.  G. REIER  2,090,426
EGG HOLDER
Filed Oct. 20, 1936
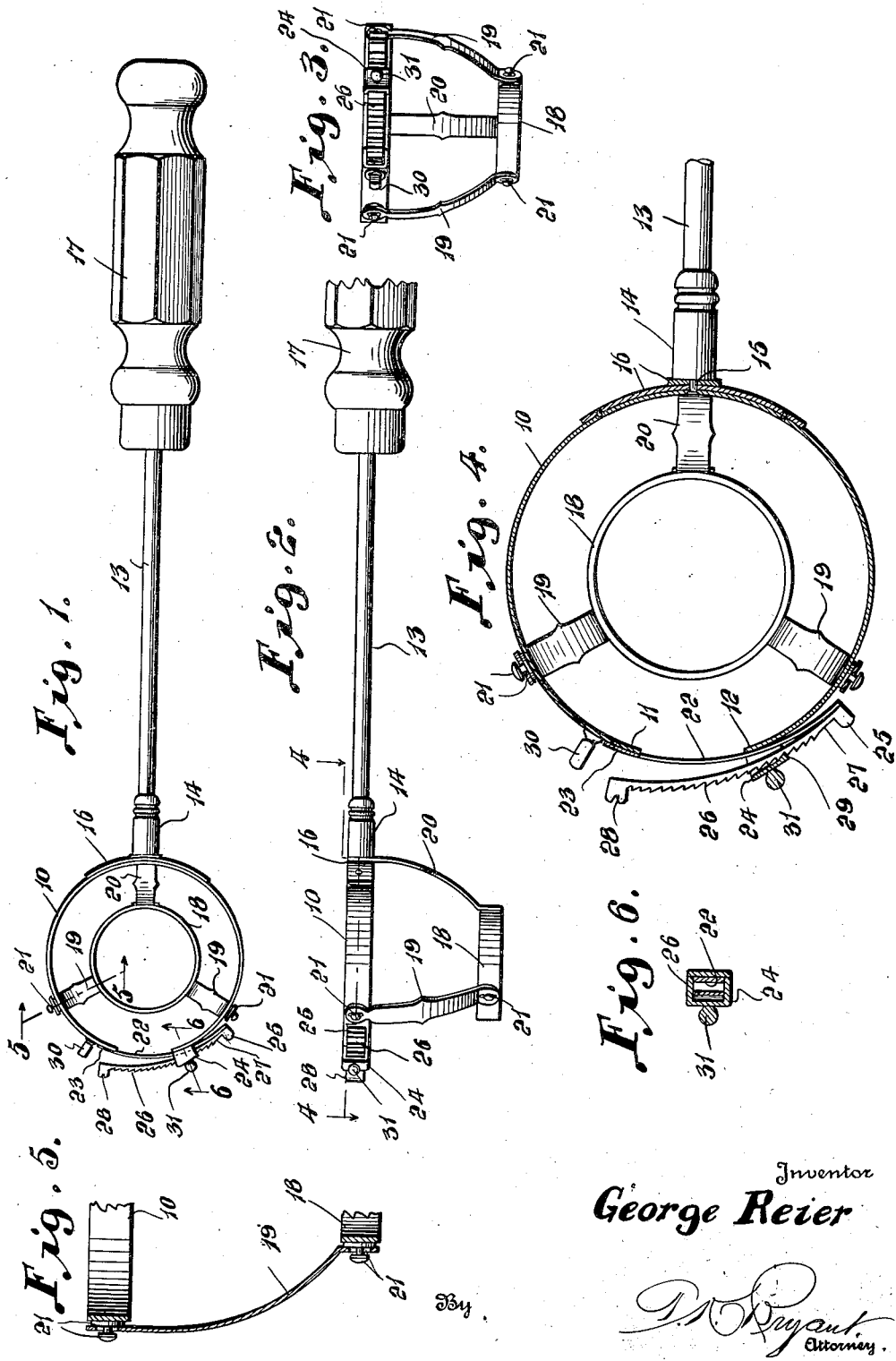
Inventor
George Reier Patented Aug. 17, 1937

2,090,426

UNITED STATES PATENT OFFICE 2,090,426

EGG HOLDER

George Reier, Baltimore, Md.

Application October 20, 1936, Serial No. 106,689

2 Claims. (Cl. 294—99)

This invention relates to certain new and useful improvements in egg holders.

The primary object of the invention is to provide a holder for eggs especially designed for use in removing eggs from boiling water and while the shell of the egg is being partially removed to permit removal of the contents of the egg without the necessity of touching the hot shell of the egg with the hands, a device of this character being highly sanitary in its use and efficient in operation.

A further object of the invention is to provide an egg holder of the foregoing character that embodies an adjustable band to accommodate the holder to eggs of different sizes with the egg securely retained in the holder against movement during removal of the contents of the egg shell.

With the above and other objects in view that will become apparent as the nature of the invention is better understood, the same consists in the novel form, combination and arrangement of parts hereinafter more fully described, shown in the accompanying drawing and claimed.

In the drawing:—

Figure 1 is a top plan view of an egg holder constructed in accordance with the present invention;

Figure 2 is a fragmentary side elevational view of the device;

Figure 3 is an outer end elevational view of the egg holder showing the pawl and ratchet connection between the expansible sections of the holder;

Figure 4 is a horizontal sectional view taken on line 4—4 of Figure 2, showing the construction of the pawl and ratchet device for holding the adjustable clamping member for the egg in adjusted position;

Figure 5 is a fragmentary detail sectional view taken on line 5—5 of Figure 1, showing the arm connection between the upper and lower band sections of the egg holder; and Figure 6 is a detail sectional view taken on line 6—6 of Figure 1.

Referring more in detail to the accompanying drawing, the egg holder comprises a skeleton frame for the support of the egg and including an upper split band 10 of resilient metal, the split ends 11 and 12 of the band normally have a tendency to move away from each other. A handle projects from the band 10 in the plane thereof and intermediate the split ends 11 and 12, the handle comprising a shank 13 having the end 14 thereof anchored to the band 10 as at 15 and reinforced by the straps 16, a suitable hand grip 17 being carried by the other end of the shank 13. A smaller uninterrupted band 18 cooperates with the large split band 10 to form a holding basket for the egg, the two bands 10 and 18 being connected by equidistantly spaced resilient legs 19 and 20, the leg 20 being located adjacent the end 14 of the handle and forming a rigid connection between the two bands while the legs 19 have pin and slot connections 21 with the two bands 10 and 18 to permit limiting movements of the bands toward and away from each other for the more effective gripping of an egg by the split band 10.

The split band 10 is adjustable for clampingly engaging eggs of different sizes and as shown more clearly in Figure 4, a resilient leaf spring 22 of substantially the same width as the split band 10 has one end thereof anchored as at 23 to the outer side of the end 11 of the split band while the other end of the leaf spring 22 projects through a tubular guide 24 anchored to the outer side of the end 12 of the split band 10, with a finger piece 25 at the free end of the leaf spring 22 to prevent complete passage of the spring through the guide 24. A resilient ratchet arm 26 is anchored at one end as at 27 to the free end of the leaf spring 22 adjacent the finger piece 25 and also extends through the tubular guide 24 with the other end of the ratchet arm normally spaced and disengaged from the leaf spring and carrying at its free end an outwardly directed grooved finger piece 28 to facilitate manipulation thereof. A ratchet tooth 29 projects inwardly from the outer wall of the tubular guide 24 for cooperation with the ratchet arm 26, these elements cooperating for holding the split band 10 in its adjusted position. Cooperating finger pieces 30 and 31 are respectively carried by the end 11 of the split band 10 and the tubular guide 24 to facilitate closing of the split band section 10 while said section may be permitted to separate or expand when pressure is exerted on the grooved finger piece 28, such as by inserting the nail of a finger of the user in said grooved finger piece and moving the free end of the ratchet arm 26 toward the leaf spring 22 to disengage the ratchet tooth 29 on the tubular guide 24 from the ratchet arm 26, the inherent resiliency of the split band 10 automatically separating the split ends thereof for the release of an egg held therein.

From the above detailed description of the invention, it is believed that the construction and use thereof will at once be apparent, it being noted that the holder has been primarily designed for removing boiled eggs from hot water with the egg clampingly retained in the holder by adjustment of the split band 10 during removal of the contents of the egg so that it is unnecessary for a person to handle the egg by hand with such inconvenience eliminated.

While there is herein shown and described the preferred embodiment of the invention, it is nevertheless to be understood that minor changes may be made therein without departing from the spirit and scope of the invention as claimed.

I claim:—

1. In an egg holder, a skeleton frame including an upper split band and a lower smaller continuous band, resilient legs connecting the bands, a handle carried by the split band, means for adjustably connecting the ends of the split band, including a spring arm attached to one end of the split band and overlapping the other end, a resilient ratchet arm carried by the free end of the spring arm and overlying the spring arm, a tubular guide on the split band through which the free end of the spring arm and the attached end of the ratchet arm extend, and a pawl on the tubular guide cooperating with the ratchet arm.

2. In an egg holder, a skeleton frame including an upper split band and a lower smaller continuous band, resilient legs connecting the bands, a handle carried by the split band, means for adjustably connecting the ends of the split band, including a spring arm attached to one end of the split band and overlapping the other end, a resilient ratchet arm carried by the free end of the spring arm and overlying the spring arm, a tubular guide on the split band through which the free end of the spring arm and the attached end of the ratchet arm extend, and a pawl on the tubular guide cooperating with the ratchet arm, and finger pieces on the tubular guide and split band to facilitate movements of the ends of the split band towards each other.

GEORGE REIER.